United States Patent [19]

Bergstrom et al.

[11] 3,852,337
[45] Dec. 3, 1974

[54] PGF TETRAOLS AND ALKANOYL ESTERS

[76] Inventors: Sune Bergstrom; Jan Sjovall, both of Kemiska Institutionen Karolinska Institutet, Stockholm 60, Sweden

[22] Filed: Aug. 23, 1972

[21] Appl. No.: 282,952

Related U.S. Application Data

[63] Continuation of Ser. No. 115,110, Feb. 12, 1971, abandoned, which is a continuation-in-part of Ser. No. 203,752, June 20, 1962, Pat. No. 3,598,858, which is a continuation-in-part of Ser. No. 199,209, April 9, 1962, abandoned, which is a continuation-in-part of Ser. No. 738,514, May 28, 1958, Pat. No. 3,069,322.

[30] Foreign Application Priority Data
Mar. 29, 1962  Great Britain .................... 12139/62

[52] U.S. Cl.......... 260/488 R, 260/410, 260/468 D, 260/514 D, 260/617 R, 424/311, 424/312, 424/343
[51] Int. Cl... C07c 35/06, C07c 69/20, C07c 69/32
[58] Field of Search...... 260/488 R, 617 R; 115/110

[56] References Cited
OTHER PUBLICATIONS
Pabon et al., Rec. Tran. Chim, 85, 1251 (1966).

Primary Examiner—Vivian Garner

[57] ABSTRACT

There are disclosed compounds of the formula:

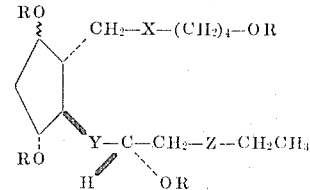

wherein Y is $-CH_2CH_2-$ or trans$-CH=CH-$, and both X and Z are $-CH_2CH_2-$, or wherein Y is trans$-CH=CH-$, X is cis$-CH=CH-$, and Z is $-CH_2CH_2-$ or cis$-CH=CH-$, wherein R is hydrogen or lower alkanoyl, and wherein ~ indicates attachment of $-OR$ to the ring in alpha or beta configuration. These novel compounds are useful for a variety of pharmacological purposes, including use as smooth muscle stimulants.

27 Claims, No Drawings

PGF TETRAOLS AND ALKANOYL ESTERS

CROSS REFERENCE TO RELATED APPLICATIONS

This application is a continuation of our copending application Ser. No. 115,110, filed Feb. 12, 1971, now abandoned, which is a continuation-in-part of our copending application Ser. No. 203,752, filed June 20, 1962, now U.S. Pat. No. 3,598,858, which is a continuation-in-part of our copending application Ser. No. 199,209, filed Apr. 9, 1962, now abandoned, which is a continuation-in-part of our copending application Ser. No. 738,514, filed May 28, 1958, now U.S. Pat. No. 3,069,322.

DESCRIPTION OF THE INVENTION

This invention relates to novel compositions of matter and is more specifically concerned with novel organic compounds of the formula:

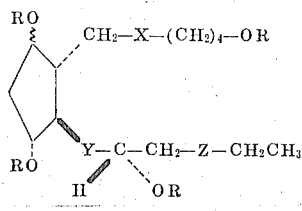

wherein Y is $-CH_2CH_2-$ or trans$-CH=CH-$, and both X and Z are $-CH_2CH_2-$, or wherein Y is trans$-CH=CH-$, X is cis$-CH=CH-$, and Z is $-CH_2CH_2-$ or cis$-CH=CH-$, wherein R is hydrogen or lower alkanoyl, and wherein ~ indicates attachment of $-OR$ to the ring in alpha or beta configuration.

Included in formula I are alcohols (tetraols) and tetraalkanoates of the formulas:

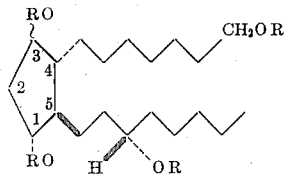

II

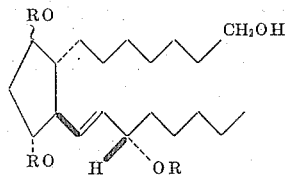

III

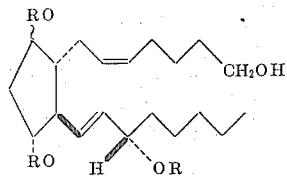

IV

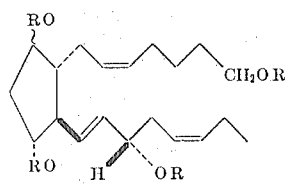

V wherein R and ~ are as defined above.

Molecules of the compounds encompassed by formulas I, II, III, IV, and V each have several centers of asymmetry. Formulas I, II, III, IV, and V are intended to represent optically active compounds each with the same absolute configuration as optically active prostaglandin E (PGE), later named prostaglandin $E_1$ ($PGE_1$), and obtained from certain mammalian tissues, for example, sheep vesicular glands. See our said U.S. Pat. No. 3,069,322. See also later publications, for example, Bergstrom et al., J. Biol. Chem. 238, 3555 (1963), Bergstrom et al., Pharmacol. Rev. 20, 1 (1968), and references cited in those.

In formulas I, II, III, IV, and V, a broken line attachment to the cyclopentane ring indicates a chain or group in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in formulas I, II, III, IV, and V is S.

Systematic names for the compounds of Formula II wherein R is hydrogen are 4α- [7-hydroxyheptyl]-5β-[(3S)-3-hydroxyoctyl]-1α,3α-cyclopentanediol and 4-α-[7-hydroxy-heptyl]-5β-[(3s)-3-hydroxyoctyl]-1α,3β-cyclopentanediol, depending on the configuration of the hydroxy at the 3-position (see numbering in formula II). For convenience hereinafter, these compounds of formula II are designated dihydro-$PGF_{1\alpha}$ alcohol and dihydro-$PGF_{1\beta}$ alcohol, respectively.

Related systematic names are also available for the compounds of formulas III, IV, and V wherein the cis and trans unsaturation in those compounds is specified in the heptyl and octyl portions of the name. But for convenience hereinafter, the compounds of formula III wherein R is hydrogen are designated $PGF_{1\alpha}$ alcohol and $PGF_{1\beta}$ alcohol, the compounds of formula IV wherein R is hydrogen are designated $PGF_2$ alcohol and $PGF_{2\beta}$ alcohol, and the compounds of formula V wherein R is hydrogen are designated $PGF_{3\alpha}$ alcohol and $PGF_{3\beta}$ alcohol, the α and β being assigned according to whether the hydroxy at the 3 position (see formula II numbering) is in alpha or beta configuration. As will subsequently appear, these PGF alcohol names are based on the relation of these compounds to certain other compounds known as the prostaglandins F, e.g., $PGF_{1\alpha}$, or $PGF_{1\beta}$ which are carboxylic acids with $-COOH$ taking the place of the $-CH_2OH$ in formula III.

With regard to formulas I, II, III, IV, and V, examples of lower alkanoyl are alkanoyl of two to eight carbon atoms, inclusive, e.g., acetyl, propionyl, butyryl, valeryl, hexanoyl, heptanoyl, octanoyl, and branched chain isomeric forms of those, e.g., isobutyryl and isovaleryl.

The novel compounds of formulas I, II, III, IV, and V are potent in causing stimulation of smooth muscle as shown, for example, by tests on strips of rabbit duodenum. These compounds are also highly active in potentiating other known smooth muscle stimulators, for example, oxytocic agents, e.g., oxytocin and the various ergot alkaloids including derivatives and analogs thereof. Accordingly, these novel formula I, II, III, IV, and V compounds are useful in place of or in combination with less than the usual amounts of these and other known smooth muscle stimulators whenever smooth muscle stimulation is needed to alleviate or prevent some physiological condition in mammals, including humans, useful domestic animals, pets, zoological specimens, and laboratory animals, for example, mice, rabbits, rats, and monkeys. For example, these compounds can be used to alleviate or prevent conditions of gastrointestinal atony in mammals, including humans, e.g., paralytic ileus following anesthesia and surgical operation or from other medical causes. For this purpose, the compound is administered parenterally, e.g., subcutaneously, intramuscularly or by intravenous injection or infusion in a dose range 0.1 to 2 mg. per kg. of body weight per day, the exact dose depending on the age, weight, and condition of the patient or animals, and the frequency and route of administration. Small repeated doses are indicated when the aim is to prevent rather than alleviate the atony.

Another smooth muscle stimulatory area where these novel formula I, II, III, IV, and V compounds are useful is in the control or prevention of atonic uterine bleeding in mammals after abortion or delivery, to aid in the expulsion of the placenta, and during the puerperium. For this purpose, the compound is administered by intravenous infusion immediately after abortion or delivery at a dose in the range about 0.1 to about 100 µg. per kg. of body weight per minute until the desired effect is obtained. Subsequent doses are given by intravenous, subcutaneous, or intramuscular injection or infusion during puerperium in the range 0.1 to 2 mg. per kg. of body weight per day, again the exact dose depending on the age, weight, and condition of the patient or animal.

In still another smooth muscle stimulatory area, these novel compounds of formulas I, II, III, IV, and V are surprisingly useful in place of oxytocin to induce labor in pregnant female animals, including man, cows, sheep, and pigs, at or near term, or in pregnant animals with intrauterine death of the fetus from about 20 weeks to term. For this purpose, the compound is infused intravenously at a dose of 0.1 to 100 µg. per kg. of body weight per minute until at or near the termination of the second stage of labor, i.e., expulsion of the fetus. These compounds are especially useful when the female is one or more weeks post-mature and natural labor has not started, or 12 to 60 hours after the membranes have ruptured and natural labor has not yet started. An alternative route of administration is oral.

The novel compounds of formulas I, II, III, IV, and V are also surprisingly useful for controlling the reproductive cycle in ovulating female mammals, including humans and animals such as monkeys, rats, rabbits, dogs, cattle, and the like. By the term ovulating female mammals is meant animals which are mature enough to ovulate but not so old that regular ovulation has ceased. For that purpose, $PGF_{2\alpha}$ alcohol, for example, is administered systemically at a dose level in the range 0.1 mg. to about 20 mg. per kg. of body weight of the female mammal, advantageously during a span of time starting approximately at the time of ovulation and ending approximately at the time of menses or just prior to menses. Intravaginal and intrauterine are alternative routes of administration. Additionally, expulsion of an embryo or a fetus is accomplished by similar administration of the compound during the first third of the normal mammalian gestation period.

The novel compounds of formulas I, II, III, IV, and V are also useful in mammals, including man, as nasal decongestants. For this purpose, the compounds are used in a dose range of about 10 µg. to about 10 mg. per ml. of a pharmacologically suitable liquid vehicle or as an aerosol spray, both for topical application.

The novel formula I, II, III, IV, and V compounds of this invention are used for the purposes described above in the alcohol form (tetraol form; Formulas I, II, III, IV, and V, all R=H) or in the tetraalkanoate form (all R=alkanoyl). When the tetraalkanoate form is used, the alkanoyl moiety is any of those within the definition of R. However, acetyl is especially preferred for optimum absorption by the body or experimental animal system. In formulas I, II, III, IV, and V, it is intended that all $R_2$ be hydrogen or that all be alkanoyl.

When the novel formula I, II, III, IV, and V compounds are used for intravenous injection or infusion, sterile aqueous isotonic solutions are preferred. For that purpose, it is preferred because of increased water solubility that R in formula I, II, III, IV, and V be hydrogen. For subcutaneous or intramuscular injection, sterile solutions or suspensions of the tetraol or tetraalkanoate in aqueous or non-aqueous media are used. Tablets, capsules, and liquid preparations such as syrups, elixirs, and simple solutions, with the usual pharmaceutical carriers, are used for oral or sublingual administration. For rectal, vaginal, or intrauterine administration, suppositories, lavage and douche preparations, and solutions as such or contained in a sponge, all prepared by methods known in the art, are used.

The compound known as $PGF_{1\alpha}$ or one of its alkyl esters, e.g., the methyl ester, is used as a reactant to prepare $PGF_{1\alpha}$ alcohol (formula III, R=H, ~ =alpha). Similarly, the compound known as $PGF_{1\beta}$ or one of its alkyl esters, e.g., the methyl ester, is used as a reactant to prepare $PGF_{1\beta}$ alcohol (formula III, R=H, ~ =beta). The formulas of $PGF_{1\alpha}$ (VI) and $PGF_{1\beta}$ (VII) are as follows:

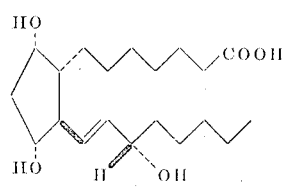

VI

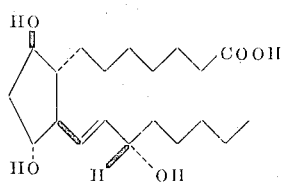

VII

Similarly, the compounds known as dihydro—$PGF_{1\alpha}$, dihydro-$PGF_{1\beta}$, $PGF_{2\alpha}$, $PGF_{2\beta}$, $PGF_{3\alpha}$, and $PGF_{3\beta}$, or their alkyl esters, e.g., the methyl esters, are used as reactants to prepare dihydro-$PGF_{1\alpha}$ alcohol, dihydro-$PGF_{1\beta}$ alcohol, $PGF_{2\alpha}$ alcohol, $PGF_{2\beta}$ alcohol, $PGF_{3\alpha}$ alcohol, and $PGF_{3\beta}$ alcohol, respectively. The formulas of dihydro-$PGF_{1\alpha}$ (VIII), $PGF_{2\alpha}$ (IX), and $PGF_{3\alpha}$ (X) are as follows:

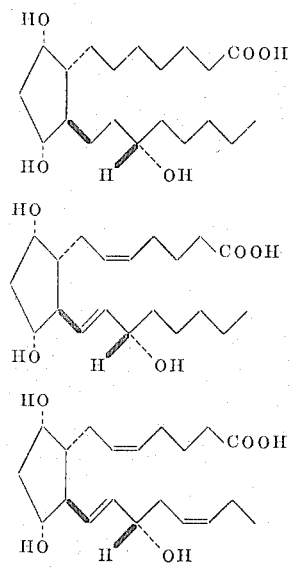

The formulas of dihydro-$PGF_{1\beta}$, $PGF_{2\beta}$, and $PGF_{3\beta}$ are the same as for VIII, IX, and X except that the upper ring hydroxy is in beta configuration rather than alpha configuration as shown in those formulas (compare formula VI and formula VII).

Dihydro-$PGF_{1\alpha}$, dihydro-$PGF_{1\beta}$, $PGF_{1\alpha}$, $PGF_{1\beta}$, $PGF_{2\alpha}$, $PGF_{2\beta}$, $PGF_{3\alpha}$, $PGF_{3\beta}$, and their alkyl esters, e.g., their methyl esters, are prepared as described in our said U.S. Pat. No. 3,069,322 or in our said copending application Ser. No. 203,752.

These transformations involve the change of the —COOH or —COOR wherein R is alkyl, e.g., methyl, of one of these PGF reactants to —CH$_2$OH. That change is accomplished by reacting the PGF reactant with any of the reagents known to effect that sort of change without at the same time saturating the olefinic unsaturation present in some of these PGF reactants. An especially preferred reagent for this purpose is lithium aluminum hydride. Procedures for using this reagent to effect this transformation are described below in the Examples.

When a tetraalkanoate of one of the formula I, II, III, IV, or V PGF alcohols (all R= alkanoyl) is desired for one of the above-described pharmacological purposes, it is prepared by reacting the corresponding tetrahydroxy compounds, i.e., all R=hydrogen, with an alkanoic anhydride corresponding to an alkanoic acid of two to eight carbon atoms, inclusive. Examples of these anhydrides are acetic anhydride, propionic anhydride, butyric anhydride, valeric anhydride, hexanoic anhydride, heptanoic anhydride, octanoic anhydride, and isomeric forms of those.

This reaction leading to these tetraalkanoates is advantageously carried out by mixing the hydroxy compound and the acid anhydride, preferably in the presence of a tertiary amine such as pyridine or triethylamine. A substantial excess of the anhydride is used, preferably about 10 to 10,000 moles of anhydride per mole of the hydroxy compound reactant. The excess anhydride serves as a reaction diluent and solvent. An inert organic diluent, for example, dioxane, can also be added. It is preferred to use enough of the tertiary amine to neutralize the carboxylic acid produced by the reaction.

The reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The desired tetraalkanoate is isolated from the reaction mixture by conventional methods. For example, the excess anhydride is decomposed with water, and the resulting mixture acidified and then extracted with a solvent such as diethyl ether. The desired tetraalkanoate is recovered from the diethyl ether extract by evaporation. The tetraalkanoate is then purified by conventional methods, advantageously by chromatography.

The invention can be more fully understood by the following examples.

EXAMPLE 1

$PGF_{2\alpha}$ Alcohol

To 1.2 mg. of lithium aluminum hydride in 10 ml. of absolute either there is added a solution of 3.6 mg. of $PGF_{2\alpha}$ in 1 ml. of redistilled dry tetrahydrofuran. After the mixture is stirred for 2 hours at room temperature, the excess lithium aluminum hydride is decomposed by addition of 0.5 ml. of 4 per cent aqueous ammonium chloride. The mixture is filtered and the layers are separated. The aqueous layer is washed three times with 2 ml. each of ether. The combined organic phases are washed once with 2 ml. of saturated sodium chloride solution, dried over sodium sulfate, and evaporated to give $PGF_{2\alpha}$ alcohol. If desired, this product residue is further purified by vapor phase chromatography, partition chromatography, and crystallization from ether-hexane to give the same material.

EXAMPLE 2

$PGF_{1\alpha}$ Alcohol

A solution of $PGF_{1\alpha}$ methyl ester (275 mg.) in 20 ml. of benzene is added to a stirred suspension of lithium aluminum hydride (1.0 g.) in a mixture of dry diethyl ether (50 ml.) and benzene (10 ml.) in an atmosphere of nitrogen gas. This mixture is stirred 2 hours at 25° C., and is then heated and stirred at reflux for 1.5 hours. The reaction mixture is cooled, and the excess lithium aluminum hydride is decomposed by the successive addition of ethyl acetate and water. The solution is filtered, dried with sodium sulfate, and evaporated under reduced pressure. The residue is crystallized from methylene chloride to give 150 mg. $PGF_{1\alpha}$ alcohol; m.p. 100°–106° C. Recrystallization from a mixture of methanol and ethyl acetate gives the same product; m.p. 105°–108° C; infrared absorption (mineral oil mull) at 3280, 1665, 1130, 1080, 1060, 1020, and 965 cm$^{-1}$.

EXAMPLE 3

$PGF_{1\beta}$ Alcohol

Following the procedure of Example 1 or Example 2, PGF$_{1\beta}$ and PGF$_{1\beta}$ methyl ester are transformed to PGF$_{1\beta}$ alcohol.

EXAMPLE 4

PGF$_{2\beta}$ Alcohol

Following the procedure of Example 1 or Example 2, PGF$_{2\beta}$ and PGF$_{2\beta}$ methyl ester are transformed to PGF$_{2\beta}$ alcohol.

EXAMPLE 5

PGF$_{3\alpha}$ Alcohol

Following the procedure of Example 1 or Example 2, PGF$_{3\alpha}$ and PGF$_{3\alpha}$ methyl ester are transformed to PGF$_{3\alpha}$ alcohol.

EXAMPLE 6

PGF$_{3\beta}$ Alcohol

Following the procedure of Example 1 or Example 2, PGF$_{3\beta}$ and PGF$_{3\beta}$ methyl ester are transformed to PGF$_{3\beta}$ alcohol.

EXAMPLE 7

Dihydro-PGF$_{1\alpha}$ Alcohol

Following the procedure of Example 1 or Example 2, dihydro-PGF$_{1\alpha}$ and dihydro-PGF$_{1\alpha}$ methyl ester are transformed to dihydro-PGF$_{1\alpha}$ alcohol.

EXAMPLE 8

Dihydro-PGF$_{1\beta}$ Alcohol

Following the procedure of Example 1 or Example 2, dihydro-PGF$_{1\beta}$ and dihydro-PGF$_{1\beta}$ methyl ester are transformed to dihydro-PGF$_{1\beta}$ alcohol.

EXAMPLE 9

PGF$_{2\alpha}$ Alcohol Tetraacetate

To 1 mg. of PGF$_{2\alpha}$ alcohol in 0.1 ml. of pyridine is added 0.1 ml. of acetic anhydride. The solution is kept under nitrogen for 4 hours at room temperature, is diluted with water, and after one-half hour, extracted with ether. The ether solution is washed successively with water, dilute hydrochloric acid, dilute sodium bicarbonate, water, and then dried over anhydrous sodium sulfate. The solution is evaporated to give the tetraacetate of PGF$_{2\alpha}$ alcohol.

Following the procedure of Example 9, dihydro-PGF$_{1\alpha}$ alcohol, dihydro-PGF$_{1\beta}$ alcohol, PGF$_{1\alpha}$ alcohol, PGF$_{1\beta}$ alcohol, PGF$_{2\beta}$ alcohol, PGF$_{3\alpha}$ alcohol, and PGF$_{3\beta}$ alcohol are each transformed to tetraacetates.

Also following the procedure of Example 9 but using propionic anhydride, isobutyric anhydride, and hexanoic anhydride each in place of the acetic anhydride, there are obtained the tetrapropionate, tetraisobutyrate, and tetrahexanoate of PGF$_{2\alpha}$ alcohol. In the same manner, the tetrapropionates, tetraisobutyrates, and tetrahexanoates of dihydro-PGF$_{1\alpha}$ alcohol, dihydro-PGF$_{1\beta}$ alcohol, PGF$_{1\alpha}$ alcohol, PGF$_{1\beta}$ alcohol, PGF$_{2\beta}$ alcohol, PGF$_{3\alpha}$ alcohol, and PGF$_{3\beta}$ alcohol are prepared.

We claim:
1. A compound of the formula:

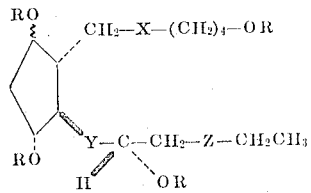

wherein Y is —CH$_2$CH$_2$— or trans—CH=CH—, and both X and Z are —CH$_2$CH$_2$—, or wherein Y is trans—CH=CH—, X is cis—CH=CH—, and Z is —CH$_2$CH$_2$— or cis—CH=CH—, wherein R is hydrogen or lower alkanoyl, all R groups being the same, and wherein ~ indicates attachment of —OR to the ring in alpha or beta configuration.

2. A compound according to claim 1 wherein ~ indicates an alpha attachment of —OR to the ring.

3. A compound according to claim 1 wherein ~ indicates a beta attachment of —OR to the ring.

4. A compound according to claim 2 wherein X, Y, and Z are —CH$_2$CH$_2$—.

5. A compound according to claim 4 wherein all R are hydrogen.

6. A compound according to claim 4 wherein all R are acetyl.

7. A compound according to claim 2 wherein Y is trans—CH=CH—, and X and Y are —CH$_2$CH$_2$—.

8. A compound according to claim 7 wherein all R are hydrogen.

9. A compound according to claim 7 wherein all R are acetyl.

10. A compound according to claim 2 wherein Y is trans—CH=CH—, X is cis—CH=CH—, and Z is —CH$_2$CH$_2$—.

11. A compound according to claim 10 wherein all R are hydrogen.

12. A compound according to claim 10 wherein all R are acetyl.

13. A compound according to claim 2 wherein Y is trans—CH=CH—, and X and Z are cis—CH=CH—.

14. A compound according to claim 13 wherein all R are hydrogen.

15. A compound according to claim 13 wherein all R are acetyl.

16. A compound according to claim 3 wherein X, Y, and Z are —CH$_2$CH$_2$—.

17. A compound according to claim 16 wherein all R are hydrogen.

18. A compound according to claim 16 wherein all R are acetyl.

19. A compound according to claim 3 wherein Y is trans—CH=CH—, and X and Z are —CH$_2$CH$_2$—.

20. A compound according to claim 19 wherein all R are hydrogen.

21. A compound according to claim 19 wherein all R are acetyl.

22. A compound according to claim 3 wherein Y is trans—CH=CH—, X is cis—CH=CH—, and Z is —CH$_2$CH$_2$—.

23. A compound according to claim 22 wherein all R are hydrogen.

24. A compound according to claim 22 wherein all R are acetyl.

25. A compound according to claim 3 wherein Y is trans—CH=CH—, and X and Z are cis—CH=CH—.

26. A compound according to claim 25 wherein all R are hydrogen.

27. A compound according to claim 25 wherein all R are acetyl.

* * * * *